July 17, 1934.  W. A. GIBBONS  1,966,585
PROCESS OF MAKING COVERED ELASTIC THREAD
Filed April 29, 1931
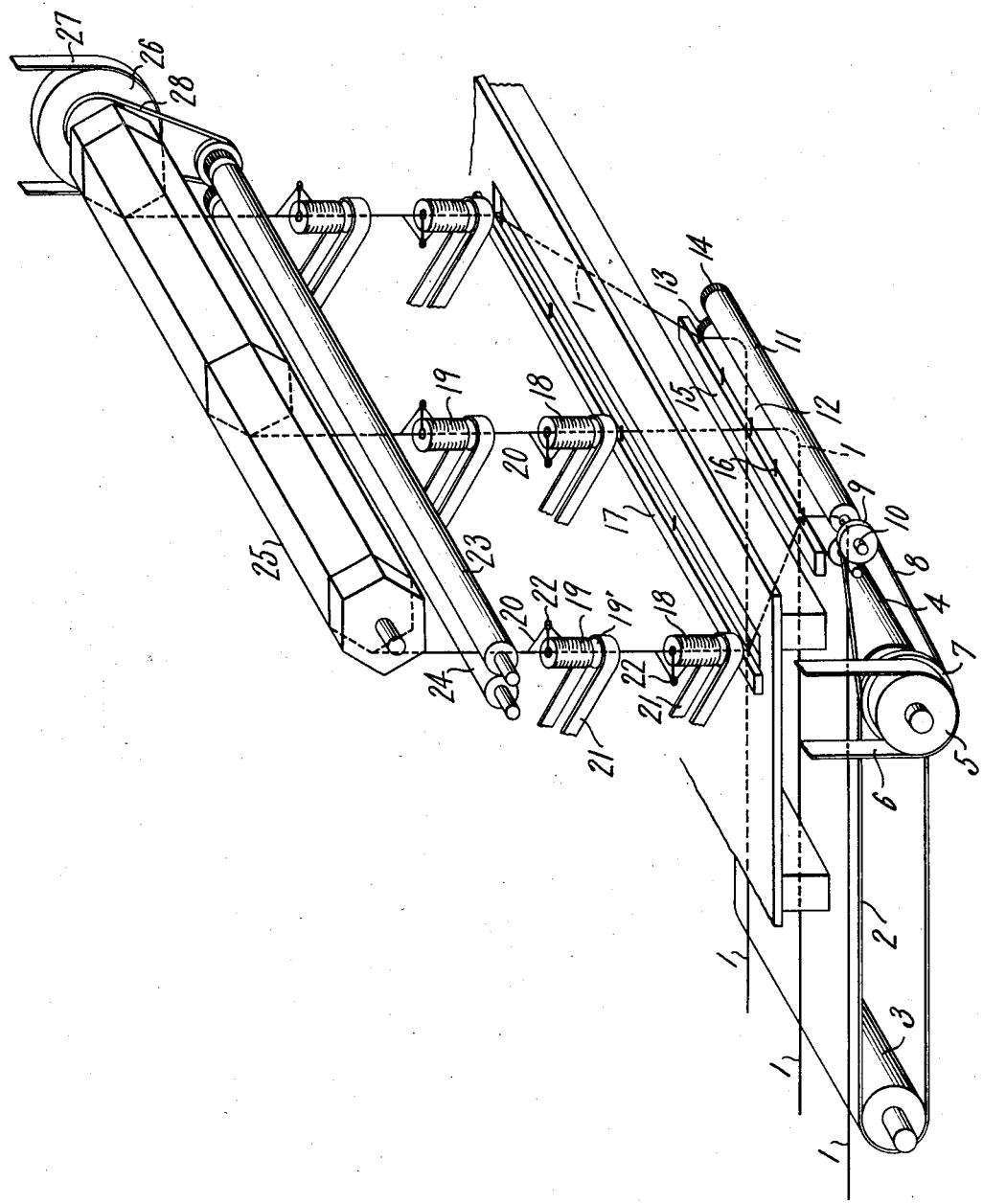
INVENTOR
WILLIS A. GIBBONS
BY
ATTORNEY Patented July 17, 1934

1,966,585

UNITED STATES PATENT OFFICE 1,966,585

PROCESS OF MAKING COVERED ELASTIC THREAD

Willis A. Gibbons, Montclair, N. J., assignor to Revere Rubber Company, Providence, R. I., a corporation of Rhode Island Application April 29, 1931, Serial No. 533,595

6 Claims. (Cl. 117—34)

In the manufacture of covered rubber thread, it is customary to first form the thread and then wind it on suitable beams or similar devices or, where a number of threads are desired for subsequent association into elastic webbing, to form hanks of a desired number of threads. This necessitates the handling of the thread in diverse ways with concomitant difficulty. Whether threads are wound on beams or spools, or laid in coils or hanks, it is necessary before covering the same to dissociate and handle them by devices designed to supply the required number of ends to a covering machine in suitable manner. This involves the separation of a required number or group of threads and the supplying of the same by continuous feeding at a predetermined tension, the latter usually being obtained by various types of braking mechanisms associated with the supply system. Rubber thread made for association with fibrous covering material in the manner described must also be talced and equally tensioned before association into coils or hanks of threads or on spools or beams. Moreover, if any considerable time elapses between the manufacture of the thread and the covering thereof, deterioration sets in and the thread may be found to have suffered from oxidation. Various other difficulties and undesirable factors develop in the manufacture and handling of thread as above described. These are due to a large extent to the multiplicity of operations necessitated.

It is an object of this invention to do away with the disadvantages of known methods of manufacturing rubber covered thread and to provide a process of simple and economical nature which eliminates the necessity of talcing, equalizing tension, winding, grouping, and separating rubber thread proposed to be covered and which eliminates the feeding of the same from the formation in which they have been associated into the covering machine by means of specially constructed devices.

Another object of the invention is to minimize oxidation of rubber thread, especially to minimize this deterioration between the time of its formation and the time it is covered.

Other objects and advantages of the invention will clearly appear when reference is had to the accompanying specification and drawing.

The invention comprises broadly the covering of rubber thread immediately after its formation.

In the practice of this invention, any type of rubber thread-forming process may be used, but it is preferable to use a process like that described in the patent of Hopkinson and Gibbons, No. 1,545,257, patented July 7, 1925, and the application of Gibbons and Sturdevant, Serial No. 524,000, filed March 20, 1931. In such a process an aqueous dispersion of rubber is streamed into a coagulant and the coagulated streams so formed are processed in order to remove the coagulant or to otherwise condition the streams into vulcanized elastic filaments.

In the drawing:

Fig. 1 is a perspective view of an apparatus by means of which the novel process is accomplished.

Rubber threads 1 are led directly from the delivery end of an apparatus in which the rubber thread is made in substantially completely vulcanized form, such as that described in the application of Gibbons and Sturdevant, Serial No. 524,000, filed March 20, 1931, on to a conveyor 2 carried by drums 3 and 4, the latter being rotated from pulley 5 by means of a belt 6 driven from a suitable source of power. On the same shaft with pulley 5 and drum 4 may be keyed another pulley 7 connected by belt 8 to a pulley 9 disposed on shaft 10. This shaft may carry nip roll 11 which is associated with the nip roll 12 driven by cog wheel 13 which meshes with a similar wheel 14 upon shaft 10. The rolls 11 and 12 should be driven at the same speed, which should be less than that of rolls 23 and 24 of the covering part of the apparatus which will now be described. The rolls 11 and 12 may be driven at a speed somewhat greater than that of the conveyer 2.

On emerging from rolls 11 and 12 the thread may be passed through a comb 15 having a plurality of reeds 16 disposed thereon to guide the threads in their travel from comb 17 and then through the center of bobbins 18 and 19. The bobbins may be wound with a suitable covering material such as cotton thread 20 and each bobbin may be mounted for rotation with shafts or spindles (not shown) which may carry pulleys 19' driven in a direction shown by the arrows. Each shaft may carry a flyer 22 freely rotatable thereon. The bobbin, spindle and flyer construction is conventional and is not shown in detail on the drawing. Nip rolls 23 and 24 pull the thread upwardly through the centers of the spindles and deliver them to drum 25 on which the covered thread may be wound or over which it may be passed preparatory to winding or associating the same in any desired manner. Drum 25 may be driven by belt 27 passing over pulley 26 and another pulley 28 may be provided to drive the nip rolls 23 and 24 in a manner similar to that in which rolls 11 and 12 are driven from shaft 5. As the rubber threads pass through the spindles, the latter rotate at a desired speed, each carrying its bobbin, which, by the thread connection through the flyer eye, carries the flyer around to wind the covering material 20 on the advancing rubber filaments. The upper bobbin mechanism may be arranged to wind the thread in the opposite direction to that in which the lower set performs its operation.

Owing to the differences in speed between the sets of feed rolls 11, 12 and 23, 24, the rubber filaments are constantly placed under tension which latter factor may be regulated to the extent desired for performing the covering operation.

By the procedure above outlined, it is apparent that it is unnecessary to talc rubber threads preparatory to their association on spools or into hanks or coils. Moreover, the necessity of special machinery for grouping threads and equalizing the individual members of the group is eliminated. No specially constructed machines for dissociating rubber filaments from spools, hanks, etc., and for applying a brake thereon as they are fed into a covering machine, is required. Immediately after their manufacture the rubber threads are covered with material which minimizes oxidation and increases the life of the product. The process is simple and involves various other advantages and economies over those previously practiced.

It is preferable for most purposes to form rubber filaments in completely vulcanized state so that it possesses elastic characteristics and is capable of being tensioned to some extent during the covering operation. I contemplate, however, the manufacture of rubber filaments in a form in which they are not completely cured but in which they possess sufficient elastic properties for processing in accordance with principles outlined above. In such case it is apparent that the vulcanization of the rubber may be completed by the subsequent application of heat or by natural completion of vulcanization at room temperature in a manner characteristic of rubber stocks containing rapid accelerators of vulcanization.

Having thus described my invention, what I claim and desire to protect by Letters Patent is:

1. The process of making a covered rubber filament comprising forming an incompletely vulcanized rubber filament, directly covering said incompletely vulcanized rubber filament with textile material, and completing the vulcanization of the rubber after said covering.

2. The process of making a covered rubber filament comprising forming an incompletely vulcanized rubber filament, directly covering said incompletely vulcanized rubber filament while under tension with textile material, and completing the vulcanization of the rubber after said covering.

3. The process of making a covered rubber filament comprising forming a rubber filament directly from an aqueous dispersion of rubber and incompletely vulcanizing the same, directly covering said incompletely vulcanized rubber filament with textile material, and completing the vulcanization of the rubber after said covering.

4. The process of making a covered rubber filament comprising forming a rubber filament directly from an aqueous dispersion of rubber and incompletely vulcanizing the same, directly covering said incompletely vulcanized rubber filament while under tension with textile material, and completing the vulcanization of the rubber after said covering.

5. The process of making a covered rubber filament comprising forming an incompletely vulcanized rubber filament and continuously with the formation thereof covering the same with textile material, and completing the vulcanization of the rubber after said covering.

6. The process of making a covered rubber filament comprising forming a rubber filament directly from an aqueous dispersion of rubber and incompletely vulcanizing the same and continuously with the formation and incomplete vulcanization thereof covering the same with textile material, and completing the vulcanization of the rubber after said covering.

WILLIS A. GIBBONS.